Figure 2:
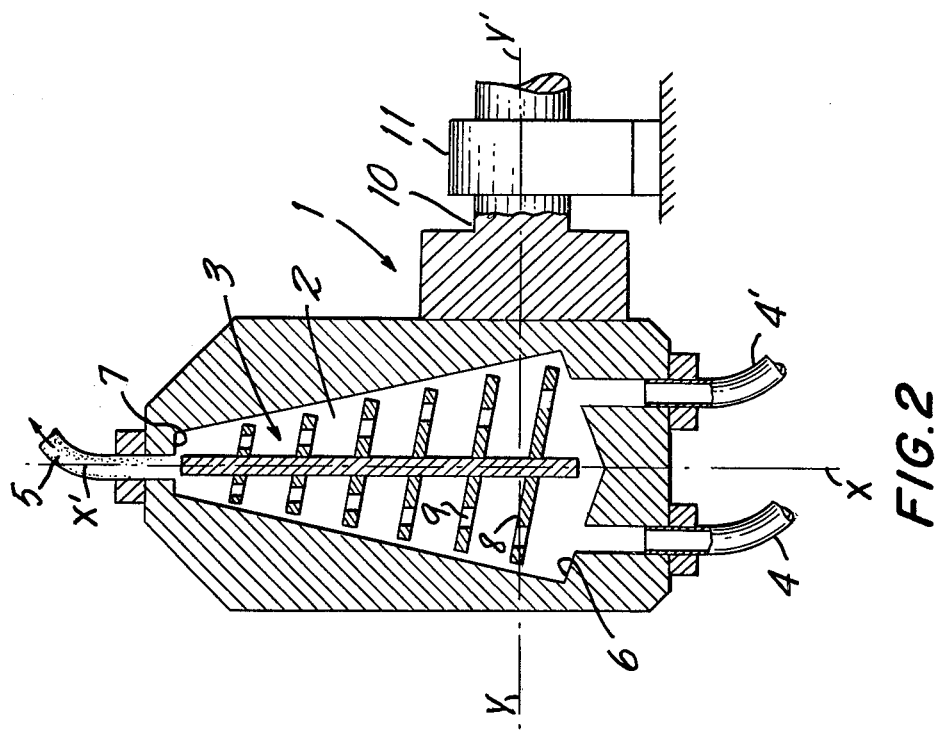

United States Patent [19]

Gouttebessis et al.

[11] 4,318,429
[45] Mar. 9, 1982

[54] INSTALLATION FOR PREPARING A LIQUID OR PASTY MIXTURE INTENDED TO BE MOLDED AND METHOD FOR THE USE OF SAID INSTALLATION

[75] Inventors: Jacques Gouttebessis, Volvic; Michel Martel, Clermont-Ferrand, both of France

[73] Assignee: Compagnie Generale des Etablissements Michelin, Clermont-Ferrand, France

[21] Appl. No.: 152,723

[22] Filed: May 23, 1980

[30] Foreign Application Priority Data

May 23, 1979 [FR] France .............................. 79 13427

[51] Int. Cl.$^3$ .............................................. B65B 3/04
[52] U.S. Cl. ........................................... 141/1; 141/9; 141/98; 141/113; 366/184
[58] Field of Search .......................... 141/9, 100–107, 141/113, 1, 98; 366/184–196, 220

[56] References Cited

U.S. PATENT DOCUMENTS 3,203,686  8/1965  Woodling et al. .................. 141/105

Primary Examiner—Houston S. Bell, Jr.
Attorney, Agent, or Firm—Brumbaugh, Graves, Donohue & Raymond

[57] ABSTRACT

An installation for manufacturing articles from one or more liquid or pasty materials which solidify in a mold, said material or materials resulting from the mixing, prior to its or their introduction into the mold, of at least two liquid and/or pasty components in a mixer comprising a chamber, a mixing device arranged in the chamber, at least two feed conduits for the components arranged at one end of the chamber, each feed conduit feeding a different component to the chamber, and a discharge conduit for the mixture arranged at the other end of the chamber is improved due to the fact that the mixer is provided with an axis of rotation which is perpendicular to the average direction of flow of the mixture which passes through the chamber and with a control which makes it possible to reverse the direction of flow of the mixture with respect to the gravitational field of the earth.

3 Claims, 2 Drawing Figures

INSTALLATION FOR PREPARING A LIQUID OR PASTY MIXTURE INTENDED TO BE MOLDED AND METHOD FOR THE USE OF SAID INSTALLATION

This invention relates to installations for manufacturing articles from one or more liquid or pasty materials which solidify in a mold. More particularly, the invention concerns installations in which the liquid or pasty material or materials result from the mixing, prior to its or their introduction into the mold, of at least two liquid and/or pasty components which are possibly relatively rapidly reactive with each other.

The mixing is carried out in a mixer comprising a chamber, a mixing device, feed conduits and a discharge conduit. The chamber contains the mixture during its treatment. The mixing device is arranged in the chamber in contact with the mixture. The feed conduits are arranged at one end of the chamber. Each of them feeds one component to the chamber. The discharge conduit is arranged at the outer end of the chamber. It connects the chamber to the mold. Thus the mixing is effected upon passage through the mixer. The mixing operation may be continuous or non-continuous, depending on the capacity of the mixer and of the mold.

Certain technical articles manufactured in installations of the type referred to above, such as gaskets or membranes, must be freed of bubbles. These bubbles originate from air present in the chamber of the mixer at the start of the mixing operation. Ordinarily, it is attempted to avoid bubbles by purging the chamber: until the disappearance of the bubbles a certain amount of mixture is introduced, which is then scrapped. On the one hand, this amount may be large if the mixture readily retains bubbles, which are all the more numerous the smaller they are, while on the other hand air always remains at the top of the chamber so that, despite the preliminary purge, air bubbles are entrained in the mixture for the entire duration of the flow thereof and, in particular, at the end of the operation. Finally, as the components of the mixture are in general expensive products, the operation of purging the chamber has an unfavorable influence on the cost. Furthermore, this operation may make it necessary to use complicated devices when the flow of the said liquid or pasty materials takes place in a mold which is in a vacuum with respect to the surrounding atmospheric pressure.

The object of the invention is to avoid all of these drawbacks and, in particular, the entrainment of air bubbles during the filling of the mold.

The invention consists in providing the mixer with an axis of rotation which is perpendicular to the average direction of flow of the mixture which passes through the chamber and with a control which makes it possible to reverse the direction of flow of the mixture with respect to the gravitational field of the earth. The method of using the installation in accordance with the invention comprises essentially the following successive steps during the course of operation: The first step is filling the chamber of the mixer with the components of the mixture, the feed conduits for the components being at the top of the chamber and the discharge conduit for the mixture being at the bottom of the chamber.

The second step is turning the mixer 180° around its axis of rotation. The feed conduits for the components are then at the bottom of the chamber and the discharge conduit for the mixture is then at the top of the chamber.

The air included in the chamber, which is preferably of frustoconical shape, then accumulates in the upper part thereof from which the discharge conduit for the mixture extends. It is then sufficient to discharge a small amount of mixture in order to evacuate the entire air contained in the chamber of the mixer. The mixer is ready to enter into use, that is to say to be connected to the mold.

The use of a mixer in accordance with the invention is particularly advantageous when the filling of the mold is effected by the so-called bottom casting technique. The mixer, ready to enter into operation as described above, is connected directly to the bottom of the mold. Upon opening the valve of the discharge conduit of the mixer, the operation of the filling of the mold is started with mixture which is free of air bubbles, and no air bubbles appear in the mixture until the end of this operation.

Figure 1:
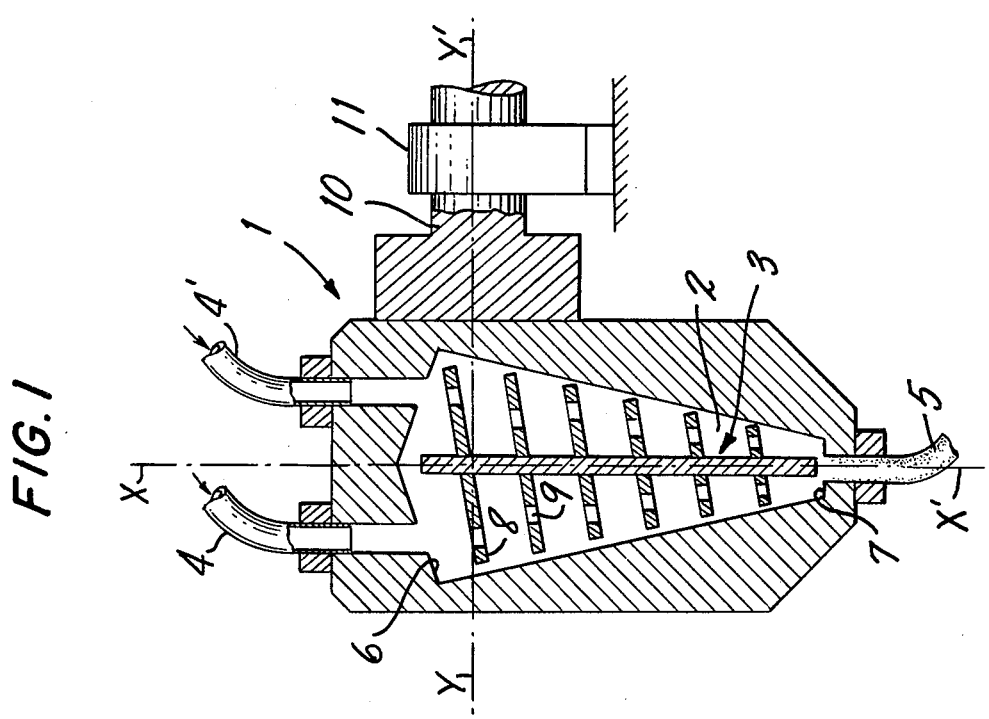

The drawing and the part of the description which refers thereto illustrate schematically one example of the use of the invention. In the drawing:

FIG. 1 shows in axial cross section a mixer according to the invention in its filling position, while FIG. 2 is a view similar to FIG. 1 of the mixer after it has been turned 180° to its discharge position.

The mixer 1 comprises a chamber 2, a mixing device 3, two feed conduits 4 and 4' and a discharge conduit 5 (shown in part).

The mixing device 3 is arranged in the chamber 2 of frustoconical shape along the axis XX' of the chamber 2, said axis XX' also defining the average direction of flow of the mixture (not shown). The two feed conduits 4,4' are arranged at one end 6 of the chamber 2 and the discharge conduit 5 is arranged at the opposite end 7 of the chamber 2. The conduits 4,4' and 5 are flexible so as to permit the turning upside down to the mixer 1 in accordance with the invention.

The mixing device 3 is driven by a motor (not shown) and is formed of a helix 8 of frustoconical appearance which narrows down from the feed conduits 4,4' to the entrance of the discharge conduit 5. This helix 8 is provided with holes 9 and its axis coincides with the axis XX' of the average direction of flow of the mixture. The two components of the mixture enter into the chamber 2 through the outlets of the feed conduits 4,4'. They mix with each other and the resultant mixture is discharged through the discharge conduit 5.

The body of the mixer 1 is fastened to a shaft 10, only a part of which has been shown in the drawing. This shaft 10 is supported in a stationary bearing pedestal 11 and its axis YY' forms a 90° angle with the axis XX' of the average direction of the flow of the mixture in the mixer 1.

During the step of filling the chamber 2 of the mixer 1 (FIG. 1), the axis XX' is vertical and the flow takes place from the top to the bottom in the direction XX'. The shaft 10 makes it possible, by any suitable control device (not shown) to turn the mixer 1 by 180°.

When the chamber 2 of the mixer 1 is filled and the mixture starts to discharge from the discharge conduit 5, the mixer 1 is, in accordance with the invention, turned upside down by the shaft 10 by means of the control device. The flow then takes place from the bottom to the top in the direction X—X'. The air bubbles which have accumulated at the base of the frustoconical chamber 2 then move towards the narrowed top of the chamber 2, rising in the direction towards the discharge conduit 5 and try to escape through said conduit 5. Thus it is sufficient to evacuate a small amount of mixture in order to deliver a mixture which is free of air bubbles.

In order to effect bottom casting (not shown), it is sufficient to connect the discharge conduit 5 of the inverted mixer (FIG. 2) to the bottom of a mold.

What is claimed is:

1. An installation for manufacturing articles from one or more liquid or pasty materials which solidify in a mold, said material or materials resulting from the mixing, prior to its or their introduction into the mold, of at least two liquid and/or pasty components in a mixer comprising a chamber, a mixing device arranged in the chamber, at least two feed conduits for the components arranged at one end of the chamber, each feed conduit feeding a different component to the chamber, and a discharge conduit for the mixture arranged at the other end of the chamber, characterized by the fact that the mixer is provided with an axis of rotation which is perpendicular to the average direction of flow of the mixture which passes through the chamber and with a control which makes it possible to reverse the direction of flow of the mixture with respect to the gravitational field of the earth.

2. A method for the use of an installation according to claim 1, characterized by the fact that it comprises essentially the following successive steps during the course of the operation:

filling the chamber of the mixer with the components of the mixture, the feed conduits for the components being at the top of the chamber and the discharge conduit for the mixture being at the bottom of the chamber;

turning the mixer 180° around its axis of rotation, the feed conduits for the components being then at the bottom of the chamber and the discharge conduit for the mixture being then at the top of the chamber, and discharging the amount of mixture containing air prior to connecting the mixer to the mold.

3. The method according to claim 2, characterized by the fact that the mixer is used to fill a mold in accordance with the so-called bottom casting technique by connecting the mixer directly to the bottom of the mold.

* * * * *